(12) United States Patent
Lipsett et al.

(10) Patent No.: US 12,214,635 B2
(45) Date of Patent: Feb. 4, 2025

(54) ALL-TERRAIN VEHICLE

(71) Applicant: Copperstone Technologies Ltd., Edmonton (CA)

(72) Inventors: Michael G. Lipsett, Edmonton (CA); Nicolas A. Olmedo, Edmonton (CA); James D. Yuen, Edmonton (CA)

(73) Assignee: COPPERSTONE TECHNOLOGIES LTD., Edmonton (CA)

( * ) Notice: Subject to any disclaimer, the term of this patent is extended or adjusted under 35 U.S.C. 154(b) by 137 days.

(21) Appl. No.: 17/910,109

(22) PCT Filed: Mar. 9, 2021

(86) PCT No.: PCT/CA2021/000019
§ 371 (c)(1),
(2) Date: Sep. 8, 2022

(87) PCT Pub. No.: WO2021/179058
PCT Pub. Date: Sep. 16, 2021

(65) Prior Publication Data
US 2023/0063961 A1 Mar. 2, 2023

Related U.S. Application Data

(60) Provisional application No. 62/987,699, filed on Mar. 10, 2020.

(51) Int. Cl.
*B60F 3/00* (2006.01)
(52) U.S. Cl.
CPC .................. *B60F 3/0023* (2013.01)
(58) Field of Classification Search
CPC ....... B60F 3/0023; B62D 55/00; B62D 57/00; B63H 1/38; B60K 28/16; B60L 3/106; B60W 2520/26
(Continued)

(56) References Cited

U.S. PATENT DOCUMENTS

| 387,671 A | * | 8/1888 | Woodruff | B63H 1/38 440/80 |
| 597,632 A | * | 1/1898 | Carpenter | B63H 1/38 440/48 |

(Continued)

FOREIGN PATENT DOCUMENTS

| CA | 1191740 A | 8/1985 |
| RU | 167625 U1 | 1/2017 |

*Primary Examiner* — Kurt Philip Liethen
*Assistant Examiner* — John D Bailey
(74) *Attorney, Agent, or Firm* — FIELD LLP

(57) ABSTRACT

An all-terrain rover is provided in which the arrangement of flanges of one or more cylinders of first and second cylinder systems allow for forward and backwards motion, as well as turning and sideways motion of the roller. An all-terrain rover is further provided in which the flanges of the first cylinder system are oriented opposite to an orientation of the flanges of the second cylinder system such that, in counter-rotation, a forward or reverse motion results from contact between the flanges and a surface of travel. An all-terrain rover is further still provided in which the flanges of a first cylinder of the first cylinder system is oriented in an opposite orientation to the flanges of a second cylinder of the first cylinder system and the orientation of a first cylinder of the second cylinder system is oriented in an opposite orientation to the flanges of a second cylinder of the second cylinder system such that each cylinder can be rotated in an individual direction and individual speed to create forward and backwards motion along the axis of the cylinders as well as steerable motion.

36 Claims, 15 Drawing Sheets

(58) Field of Classification Search
USPC .......... 180/7.1, 7.2, 197; 440/12.65; 701/90
See application file for complete search history.

(56) References Cited

U.S. PATENT DOCUMENTS

| | | | | |
|---|---|---|---|---|
| 617,905 A * | 1/1899 | Peterson et al. | ......... | B63H 1/38 440/12.65 |
| 669,210 A * | 3/1901 | Burch | .................... | B60B 19/003 415/72 |
| 836,821 A * | 3/1901 | Nelson | .................... | B63H 1/38 440/12.65 |
| 864,106 A * | 11/1906 | Peavey | .................. | B60B 19/003 180/7.2 |
| 872,140 A * | 8/1907 | Mikulasek | ............ | B63H 16/14 440/48 |
| 1,041,232 A * | 10/1912 | Berry | ...................... | B63H 1/38 415/60 |
| 1,211,345 A * | 1/1917 | Petersen | ............... | B60B 19/003 180/6.2 |
| 1,303,764 A * | 5/1919 | Broadway | ............ | B60B 19/003 299/30 |
| 1,321,304 A * | 11/1919 | Hamilton | ................. | B63H 1/12 74/665 GB |
| 1,388,545 A * | 8/1921 | Bohan | ..................... | F42B 23/00 299/87.1 |
| 1,431,440 A * | 10/1922 | Burch | ..................... | B62M 27/00 180/188 |
| 1,748,408 A * | 2/1930 | Bridwell | .................. | B63H 1/38 416/86 |
| 2,154,191 A * | 4/1939 | Welsh | ..................... | B63H 1/38 440/98 |
| 2,376,647 A * | 5/1945 | Akins | ................... | B60F 3/0023 440/12.53 |
| 2,495,643 A * | 1/1950 | Pidgeon | ................ | B64C 35/005 244/50 |
| 2,665,655 A * | 1/1954 | Brown | .................... | B63B 35/10 114/42 |
| 2,706,958 A * | 4/1955 | Cutting | .................... | B63H 1/38 440/12.65 |
| 2,764,117 A * | 9/1956 | De Persia | ............. | B60F 3/0023 440/12.65 |
| 3,030,908 A * | 4/1962 | Stanley | .................... | B63H 1/38 440/12.65 |
| 3,059,711 A * | 10/1962 | Becker | ................... | B62M 27/02 180/188 |
| 3,224,407 A * | 12/1965 | Bertrand | .............. | B62D 57/036 440/12.65 |
| 3,229,658 A * | 1/1966 | Schrader | ................. | B63H 1/38 440/12.65 |
| 3,250,239 A * | 5/1966 | Garate | ..................... | B63H 1/38 440/12.65 |
| 3,266,588 A * | 8/1966 | Neumeyer | ............ | B60F 3/0023 192/12 D |
| 3,333,563 A * | 8/1967 | De Bakker | ........... | B60F 3/0023 440/12.65 |
| 3,354,861 A * | 11/1967 | Wilcox | ................. | B60F 3/0023 440/12.65 |
| 3,375,885 A * | 4/1968 | Scott | ........................ | E02D 1/02 175/94 |
| 3,376,945 A * | 4/1968 | Kaprelian | ............... | B62D 61/00 280/491.1 |
| 3,381,650 A * | 5/1968 | Isamu | ..................... | B63B 1/10 440/12.65 |
| 3,395,671 A * | 8/1968 | Zimmerman, Jr. | ... | B60F 3/0023 475/23 |
| 3,396,690 A * | 8/1968 | Tsunazawa | ............ | B62D 57/02 440/12.65 |
| 3,397,668 A * | 8/1968 | Mainguy | ................. | B63H 1/38 440/12.65 |
| 3,405,777 A * | 10/1968 | Kemenczky | ......... | B62D 57/036 180/7.2 |
| 3,418,960 A * | 12/1968 | Nelson | .................. | B60F 3/0023 301/41.1 |
| 3,591,241 A * | 7/1971 | Allen | ..................... | B62D 57/00 104/168 |
| 3,682,127 A * | 8/1972 | Waquet | ................. | B60F 3/0023 440/12.65 |
| 3,746,112 A * | 7/1973 | Ilon | .......................... | B63H 1/12 301/5.23 |
| 3,906,888 A * | 9/1975 | Justinien | ................. | B63B 1/36 440/98 |
| 4,198,917 A * | 4/1980 | Oshima | .................. | B63B 35/08 114/42 |
| 4,476,948 A * | 10/1984 | Komoto | ............... | B60F 3/0023 440/12.57 |
| 4,867,716 A * | 9/1989 | McFarland | ........... | B63H 16/12 440/98 |
| 5,089,967 A * | 2/1992 | Haseda | ..................... | B62D 6/04 303/146 |
| 5,203,274 A * | 4/1993 | Hart | ...................... | B60F 3/0023 440/5 |
| 5,203,729 A * | 4/1993 | Beller | .................... | B60F 3/0023 446/163 |
| 5,392,871 A * | 2/1995 | McFarland | ........... | B60F 3/0023 440/5 |
| 5,509,370 A * | 4/1996 | Kovacs | .................. | B60F 3/0023 180/7.2 |
| 5,678,271 A * | 10/1997 | Baron | .................... | G21C 13/06 15/340.1 |
| 6,179,073 B1 * | 1/2001 | Chhabra | ................ | B62D 55/08 180/9.1 |
| 6,966,807 B2 * | 11/2005 | Leonov | ................. | B60F 3/0023 440/98 |
| 8,004,405 B1 * | 8/2011 | Gal | ........................ | G08B 13/122 340/556 |
| 8,344,535 B2 * | 1/2013 | Pitre | ....................... | F03B 13/00 290/43 |
| 8,430,044 B2 * | 4/2013 | Foo | ....................... | B62D 57/036 440/12.65 |
| 8,579,056 B1 * | 11/2013 | Frank | .................... | B62D 57/036 440/12.65 |
| 8,710,688 B2 * | 4/2014 | Pitre | ....................... | F03D 9/25 290/43 |
| 8,800,695 B2 * | 8/2014 | Couture | .................. | B25J 5/005 180/9.5 |
| 8,936,268 B2 * | 1/2015 | Craven | ................... | B62B 1/008 280/654 |
| 9,115,542 B1 * | 8/2015 | Calvert | ................... | E21B 49/02 |
| 9,121,156 B1 * | 9/2015 | Calvert | ................... | E02D 27/34 |
| 9,322,394 B2 * | 4/2016 | Pitre | ....................... | F01D 5/023 |
| 9,624,909 B2 * | 4/2017 | Pitre | ....................... | F01D 5/023 |
| 10,076,938 B2 * | 9/2018 | Olmedo | ................. | G01N 33/24 |
| 10,252,784 B2 * | 4/2019 | Restea | ..................... | B63H 1/12 |
| 10,371,306 B2 * | 8/2019 | Souvestre | ............... | F16L 55/32 |
| 10,974,292 B2 * | 4/2021 | Jansen | ................... | B01J 8/0025 |
| 11,498,652 B2 * | 11/2022 | Tran | ....................... | E21D 9/10 |
| 2005/0118903 A1 * | 6/2005 | Leonov | ................. | B63H 21/17 440/98 |
| 2007/0108716 A1 * | 5/2007 | Scruggs | ................. | B62D 15/00 152/209.1 |
| 2009/0301779 A1 * | 12/2009 | Bick | ....................... | E21B 7/26 175/323 |
| 2010/0130077 A1 * | 5/2010 | Foo | ....................... | B62D 57/032 440/12.65 |
| 2010/0140942 A1 * | 6/2010 | Pitre | ....................... | F01D 5/023 290/55 |
| 2013/0105233 A1 * | 5/2013 | Couture | ................ | B62D 55/075 180/9.1 |
| 2017/0259633 A1 * | 9/2017 | Olmedo | ................. | B60F 3/0061 |
| 2017/0292329 A1 * | 10/2017 | Hayik | .................... | E21B 7/06 |
| 2018/0119868 A1 * | 5/2018 | Souvestre | ............... | B63H 1/12 |
| 2021/0156108 A1 * | 5/2021 | Marvi | .................... | E02F 3/246 |
| 2022/0259070 A1 * | 8/2022 | Munro | ................. | B62D 57/036 |

* cited by examiner

ALL-TERRAIN VEHICLE

FIELD OF DISCLOSURE

The present disclosure relates to the field of geotechnical surveying and sample procurement, and particularly the use of remote-controlled, unmanned rovers or vehicles for sampling and measurement in difficult terrain.

DESCRIPTION OF RELATED ART

Tailings deposits and other mining and oil-producing by-products must be periodically characterized and sampled to determine post-depositional strength, mineral abundance, and environmental impact, for both process efficiency and regulatory compliance. Water composition and subsurface topography may also be of interest. Locations are often remote; and terrain is irregular and difficult to access, such as wetlands, soft sand, beaches, mudflats, sludge, snow-covered ground, and permafrost, as well as open water.

In a typical application, mine operators must wait until tailings deposits freeze over in the winter to be able to move safely across the deposits, or employ large amphibious barges that negatively affect the deposit characteristics, and can only traverse some deposits. For winter sampling, a barrel sampler such as that developed by the Cold Regions Research and Engineering Laboratory (CRREL) may be used, a technology that was developed to collect a core of frozen soil or ice in a permafrost zone. However, there are many tailings in areas that do not freeze which still need to be measured.

The limited ability to reach locations for sampling prevents monitoring and trend analysis that more frequent sampling during the year would permit. In other areas, the tailings deposit is saturated and may have a water cap, and so samples are in a fluid form; and access may require traversing a number of different possible terrains and bodies of water. In all cases, access is often potentially hazardous for a human operator.

In the past, remote all-terrain rovers have been tested to access tailings and other areas of interest over a number of different terrain and climate types, carrying sampling tools, instruments, and manipulators to collect samples and make measurements in situ.

One such rover is described in Applicant's U.S. Pat. No. 10,076,938. The rover provides a pair of cylinders arranged on a frame and powered by motors to move across the terrain and water for the purposes of sample taking and surveying. The rover of the '938 patent is limited in its maneuverability and steering. It also presents limitations with respect to replacement of parts and versatility.

SUMMARY OF THE DISCLOSURE

An all-terrain rover is provided. The rover includes a frame; first and second cylinder systems, each cylinder system being arranged on opposing sides of the frame, each cylinder system including at least two cylinders arranged co-axially with one another, each cylinder having a spiral auger flange arranged on an exterior surface thereof and a drive unit associated with each cylinder system, each drive unit including a motor and a power source; and sampling or measurement equipment mounted onto the rover. Arrangement of flanges of the one or more cylinders of the first and second cylinder systems allow for forward and backwards motion, as well as turning and sideways motion of the roller.

An all-terrain rover is further provided including a frame; and first and second cylinder systems, each cylinder system being arranged on opposing sides of the frame, each cylinder system including at least two cylinders arranged co-axially with one another, each cylinder having a spiral auger flange arranged on an exterior surface thereof. The spiral flanges of the first cylinder system are oriented opposite to an orientation of the spiral flanges of the second cylinder system such that, in counter-rotation, a forward or reverse motion results from contact between the flanges and a surface of travel.

An all-terrain rover is further still provided including a frame; and first and second cylinder systems, each cylinder system being arranged on opposing sides of the frame, each cylinder system including at least two cylinders arranged co-axially with one another, each cylinder having a spiral auger flange arranged on an exterior surface thereof. The spiral flanges of a first cylinder of the first cylinder system is oriented in an opposite orientation to the spiral flanges of a second cylinder of the first cylinder system and the orientation of a first cylinder of the second cylinder system is oriented in an opposite orientation to the spiral flanges of a second cylinder of the second cylinder system such that each cylinder can be rotated in an individual direction and individual speed to create forward and backwards motion along the axis of the cylinders as well as steerable motion.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

DETAILED DESCRIPTION OF THE DISCLOSURE

Figure 1:
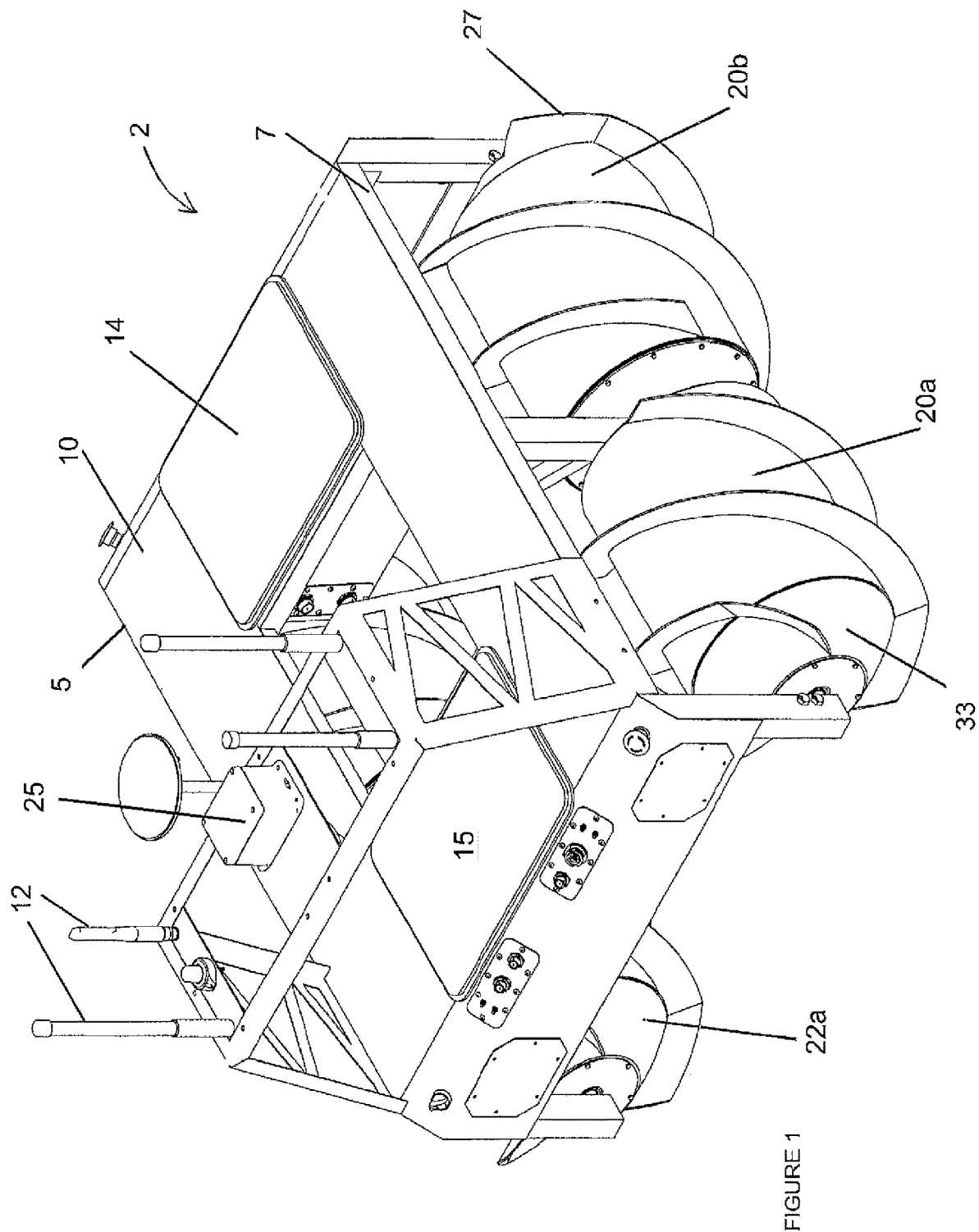
FIG. 1 is a perspective view of the all-terrain rover, according to an embodiment of the present disclosure.
Figure 2:
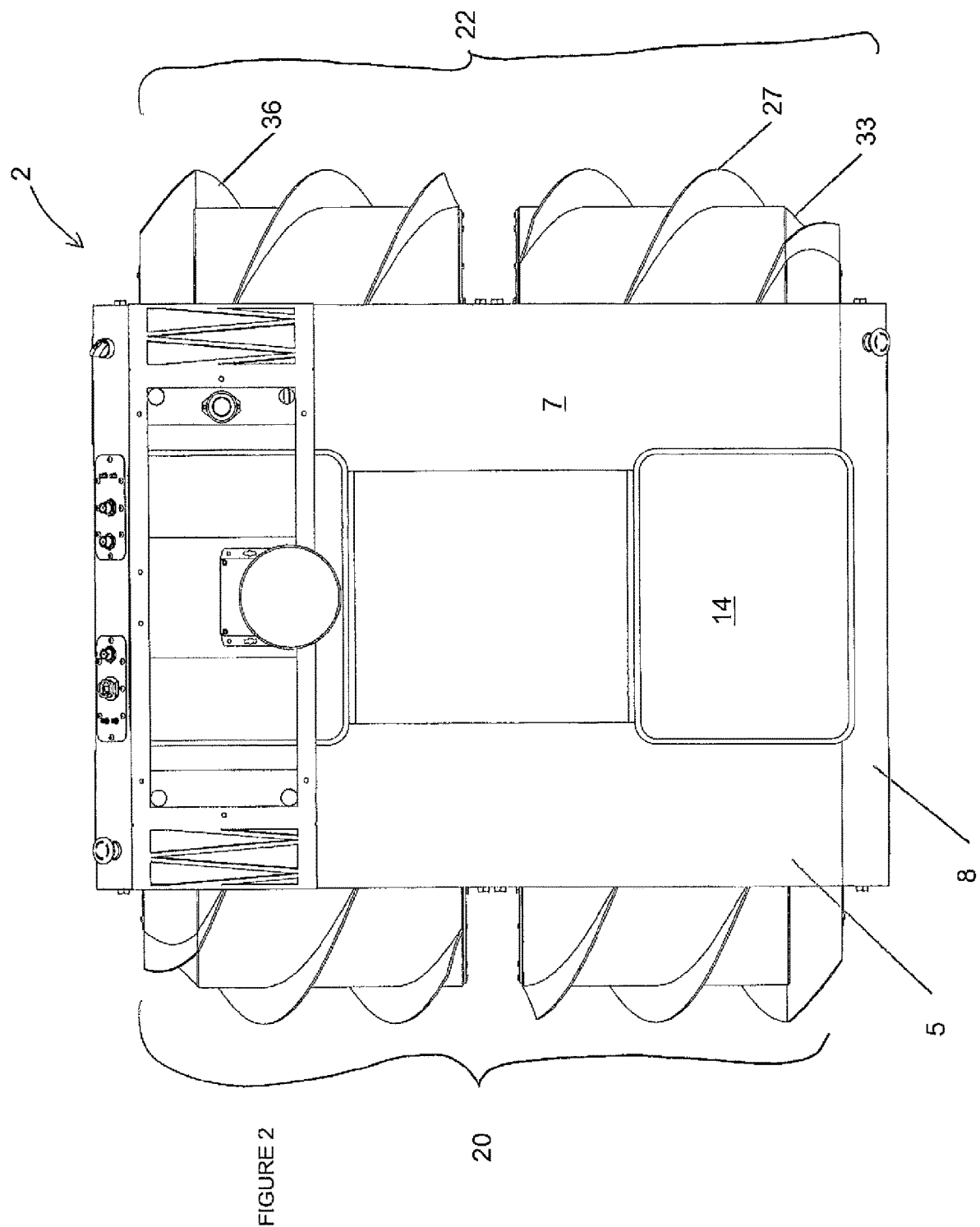
FIG. 2 is a top plan view of the all-terrain rover, according to an embodiment of the present disclosure.
Figure 3:
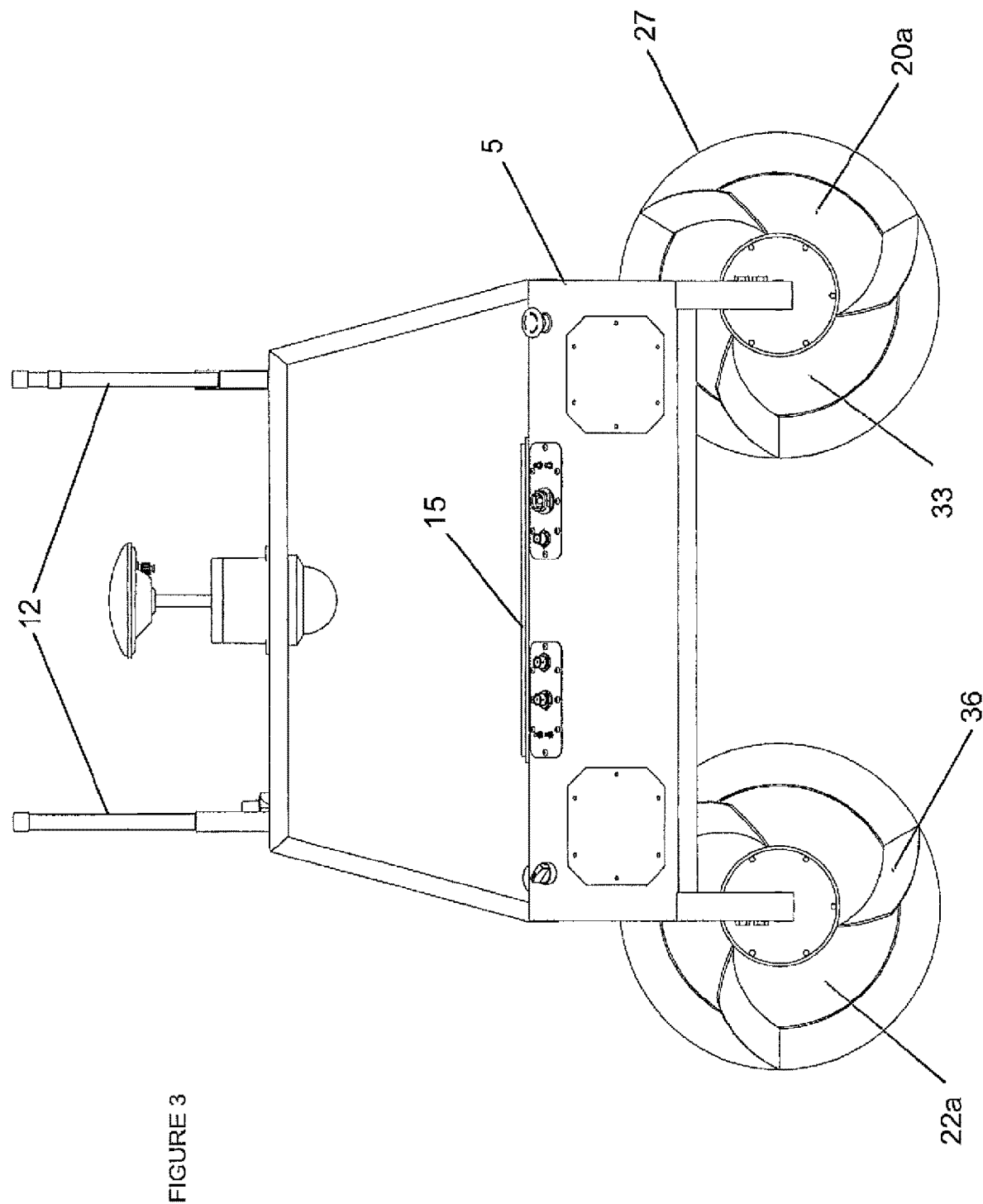
FIG. 3 is a front elevation view of the all-terrain rover, according to an embodiment of the present disclosure.
Figure 4:
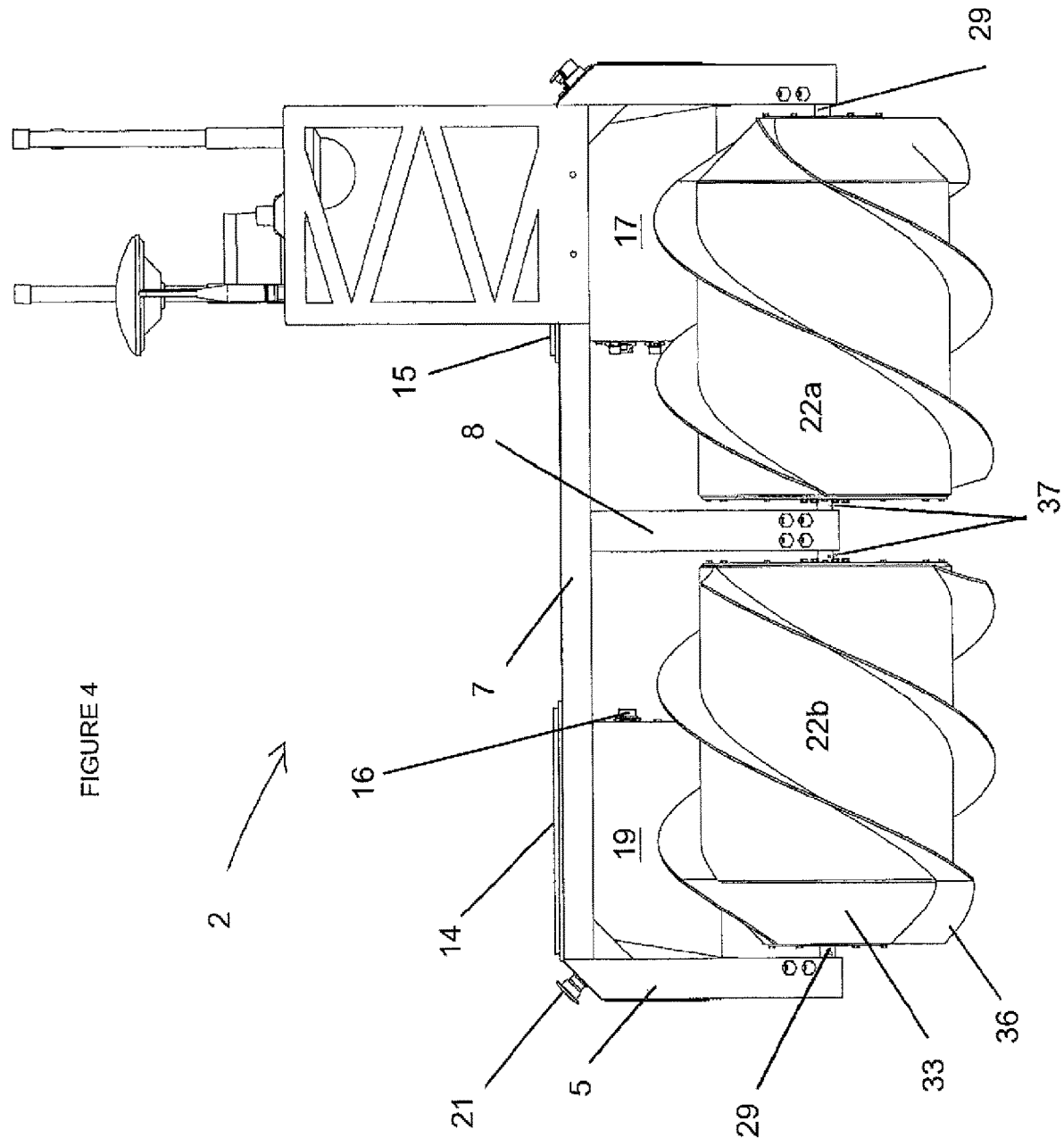
FIG. 4 is a side elevation view of the all-terrain rover, according to an embodiment of the present disclosure.

Preferred embodiments of the present disclosure and their advantages may be understood by referring to FIGS. 1-5$b$, wherein like reference numerals refer to like elements.

The all-terrain rover 2 or vehicle of the present disclosure may be remote-controlled or robot-controlled (autonomously-controlled), and is capable of maneuvering by screw-propulsion over a variety of terrain, from hard ground, to soft and sticky tailings deposits, to water and wetlands with vegetation, to snow and ice, while carrying payloads to collect samples and make measurements at the surface and below the surface. In one embodiment the system is unmanned, and has autonomous operation capability such that it may drive over tailings deposits that are currently inaccessible to other vehicles, and may be driven submerged by employing sealed electronics enclosures. The present rover provides year-round safe access to certain types of tailings deposits for bathymetric surveys to measure bottom depth, and sample collection and monitoring when ambient temperatures may be above or below freezing for significant periods. Remote access will allow monitoring of the performance of tailings processes at any time, instead of needing to wait until the deposits freeze over in the winter to become trafficable. There are also many other mining operations worldwide producing fluid tailings (and other types of terrains, such as eroding shorelines, river deltas, solution mining operations, surf, river ice jams, and aquaculture operations) that may be monitored by the rover 2. There are also applications such as sewers and slop tanks where piping and process vessels that are partially filled with sludge or viscous fluid may be accessed by the rover 2. The rover 2 is also applicable to extraterrestrial use for moon and planetary exploration; and it may be enlarged for carrying cargo or people.

With reference to FIGS. 1-4, the rover 2 has a ladder frame 5 that consists generally of edge beams 7 connected by one or more crosspieces 8. Mounted to one or more crosspieces 8 is a platform 10 having payload systems containing equipment/payload affixed thereto and utility box or control system 15 containing controls, electronics and electrical systems. The platform 10, may also incorporate one or more sealed hatches 14. In some embodiments, the platform may include a first enclosure 17 for containing the control system 15 and a second enclosure 19 for containing one or more batteries. The enclosures 17, 19 may also include watertight caps 16 over any electrical connectors on an outside thereof. The frame 5 also serves to maintain a distance between auger cylinder systems 20, 22 that are rotated to provide propulsion. The equipment/payload may be contained within the utility box/control system 15.

The rover 2 may also have sampling equipment 25 mounted on the payload system or elsewhere on the rover 2, to easily procure a sample when the rover 2 is in position to do so. In one embodiment, utility boxes 15 may be integrated into the frame 5 such that the edge beams 7 forms the structure of the boxes.

The ladder frame 5 may be a lightweight frame out of aluminum or a steel truss frame, and may include composite materials, or a combination of materials joined by fasteners, adhesives, or welding. A fixed frame or an extendible frame allows for easy transport but may be expanded to a larger footprint to improve stability. The frame 5 may protrude completely out of the fluid or the frame 5 may include a floating hull section (not shown), in which case a friction-reducing coating may be used, or a friction reducing compound applied periodically by pumping it through ports in the hull to lubricate the hull. The hull may also allow for submerged operation by controlling buoyancy.

The auger cylinder systems 20, 22 lie along each side of the frame 5 or under the frame 5. Each multi-cylinder system 20, 22 is preferably comprised of two or more cylinders that are co-axial to one another—in this case 20$a$, 20$b$ and 22$a$ and 22$b$, although more cylinders can also be included in each cylinder system 20/22. Preferably an equal number of cylinders are present on either side of frame 5. Each of the cylinders 20$a$, 20$b$, 22$a$ and 22$b$ is preferably connected to its own independent drive unit 30. Each drive unit 30 is powered by a separate motor 35.

Figure 5:
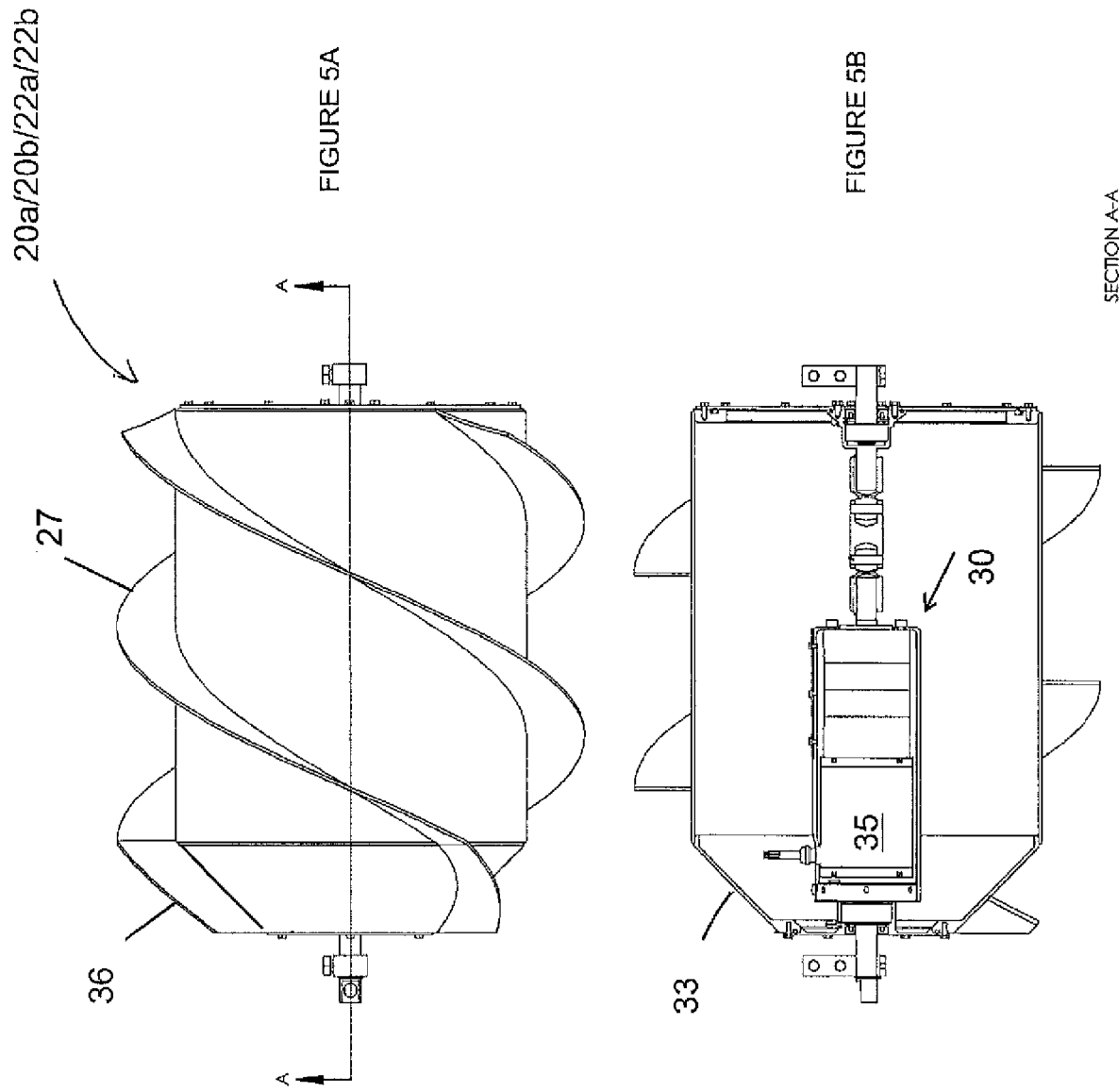
FIG. 5a is a side elevation view of one cylinder of the present disclosure.
FIG. 5b is a cross section top view of a dedicated drive unit and its associated cylinder in one embodiment of the present disclosure.
Figure 6:
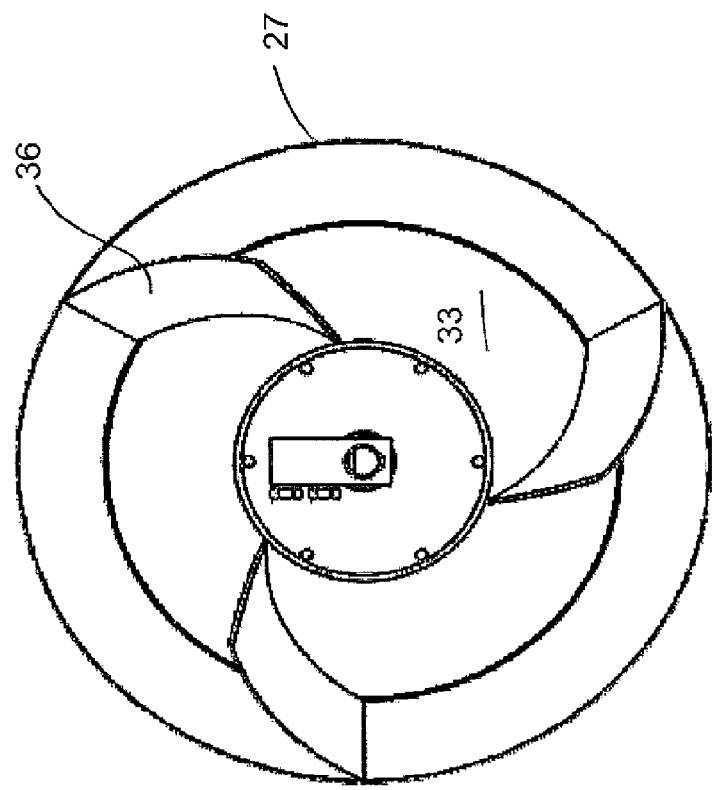
FIG. 6 is an end elevation view of one cylinder of the present disclosure.
Figure 7:
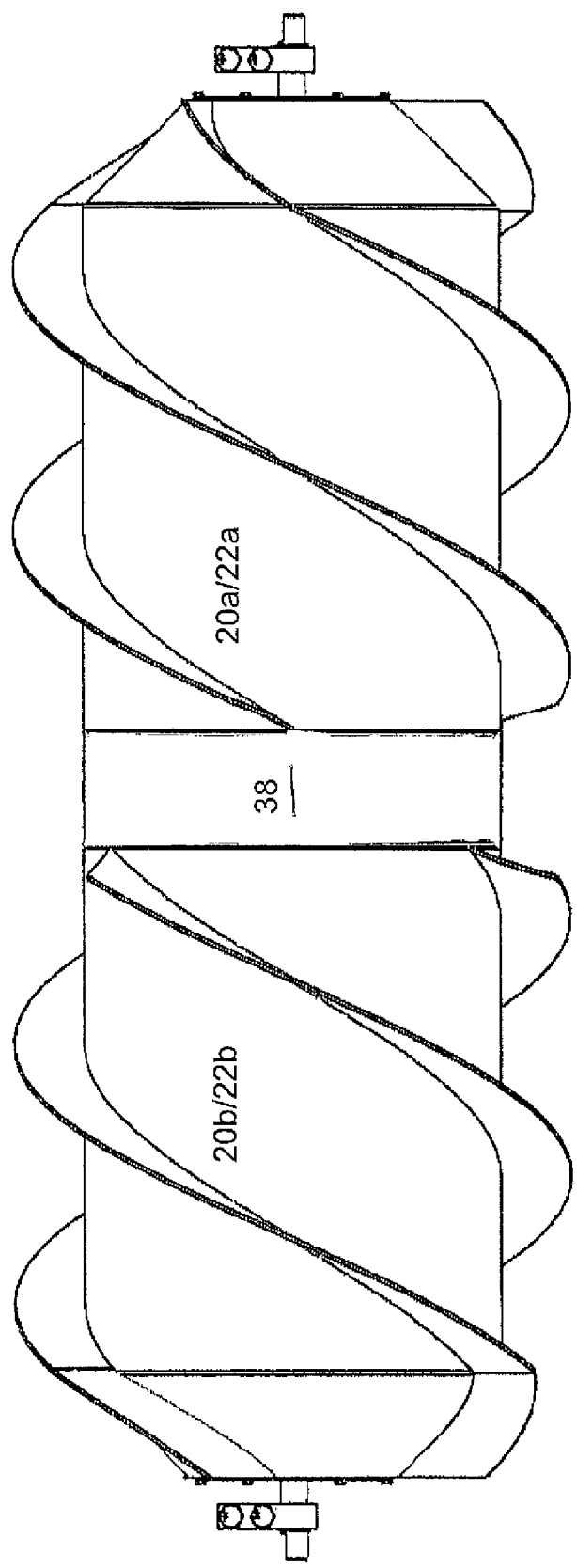
FIG. 7 is a side elevation view of a first embodiment of a pair of cylinders of the present disclosure.
Figure 8:
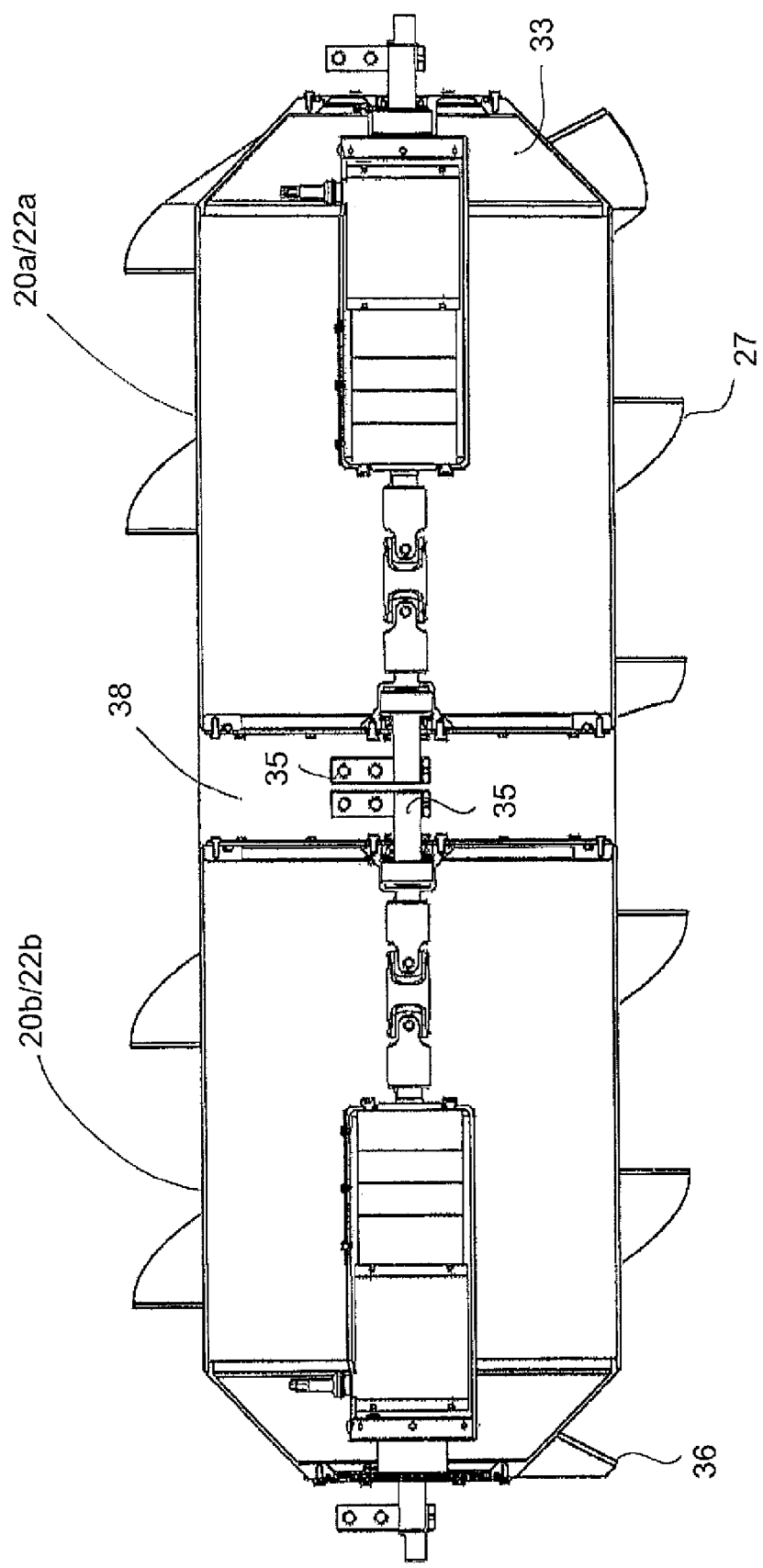
FIG. 8 is a cross sectional view of a second embodiment of a pair of cylinders of the present disclosure.
Figure 9A:
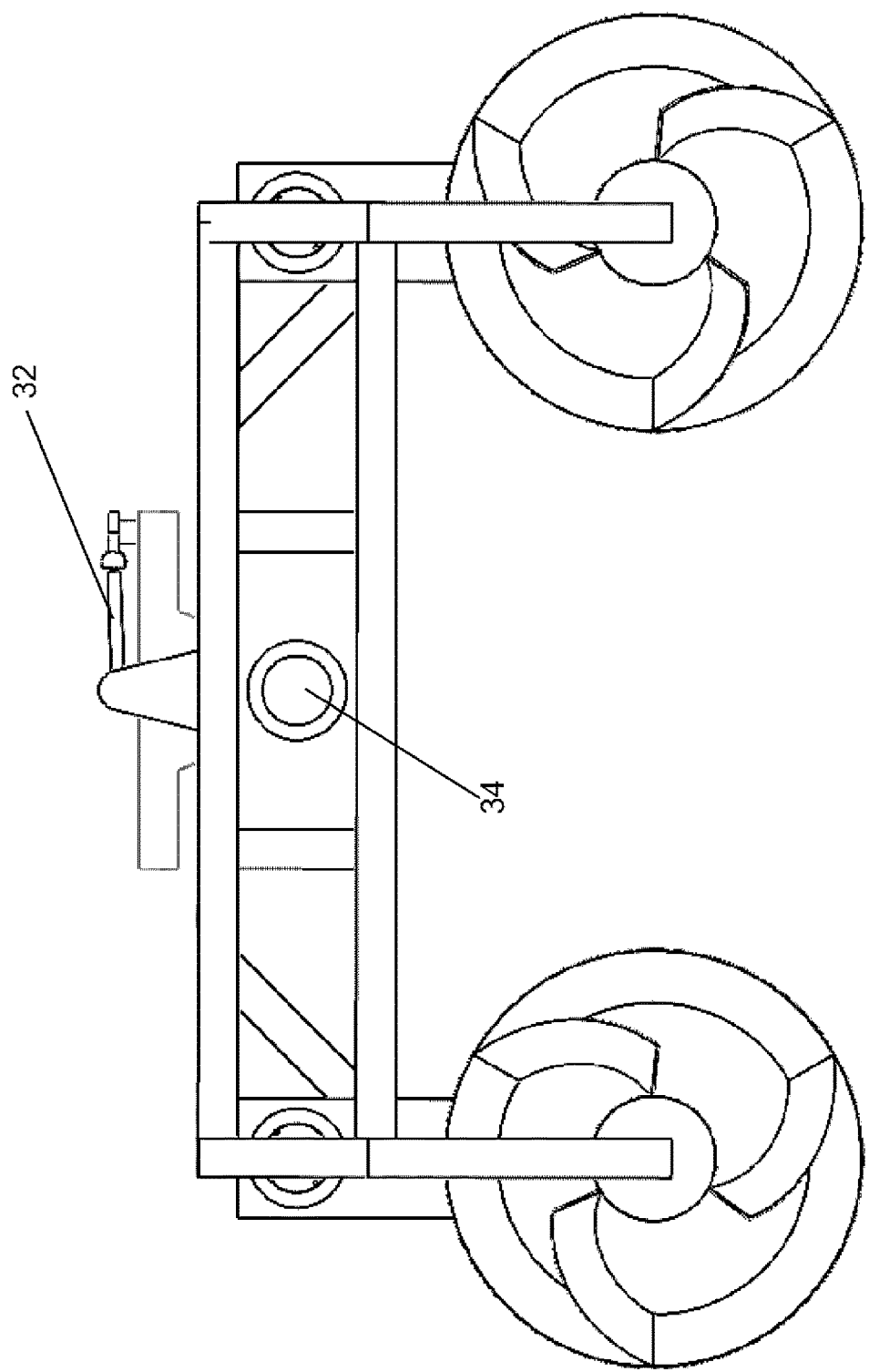
FIG. 9A is a front end view of the all-terrain rover, according to an embodiment of the present disclosure with a bogey style suspension, in a neutral position.
Figure 9B:
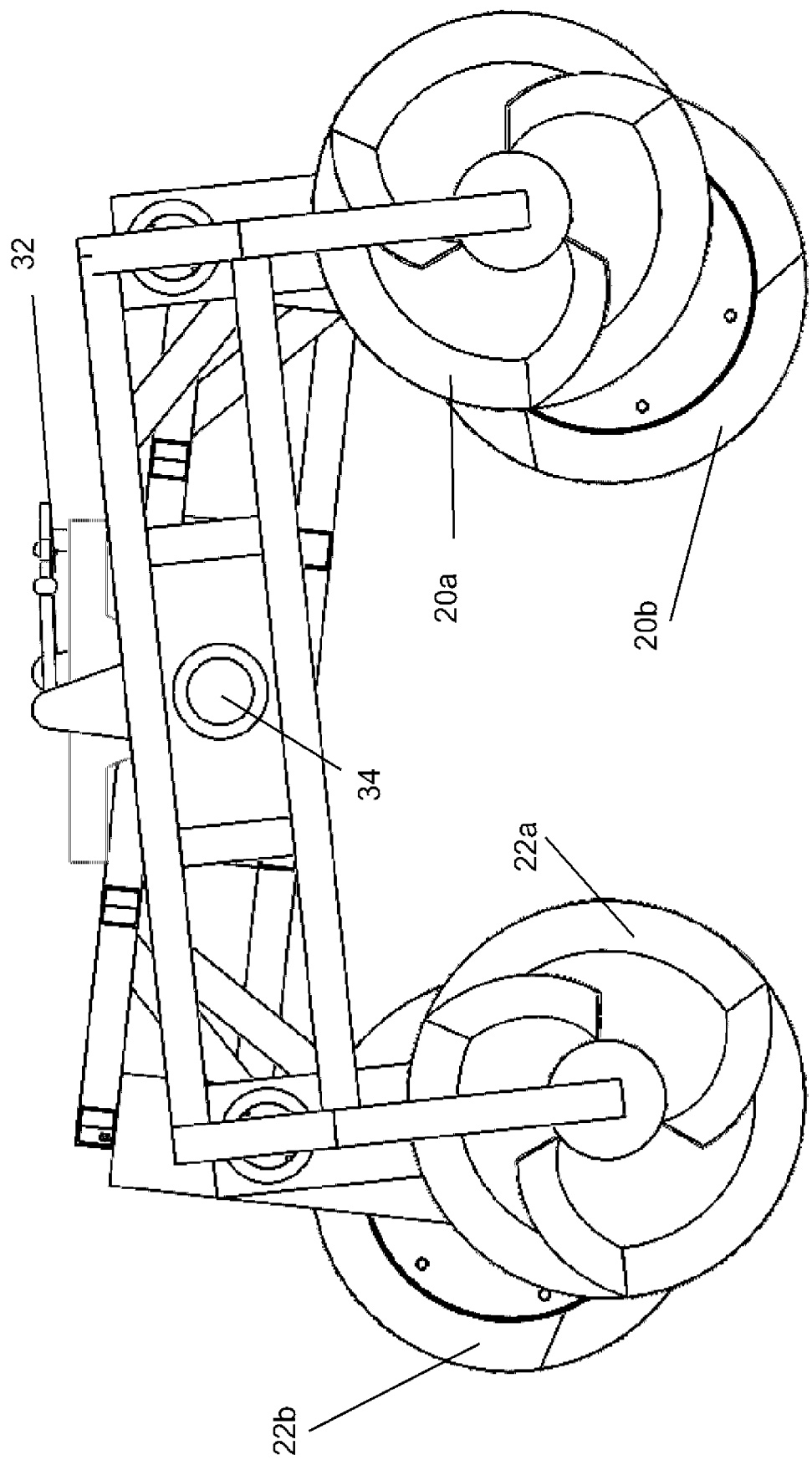
FIG. 9B is a front end view of the all-terrain rover, according to an embodiment of the present disclosure with a bogey style suspension, showing suspension movement.
Figure 10A:
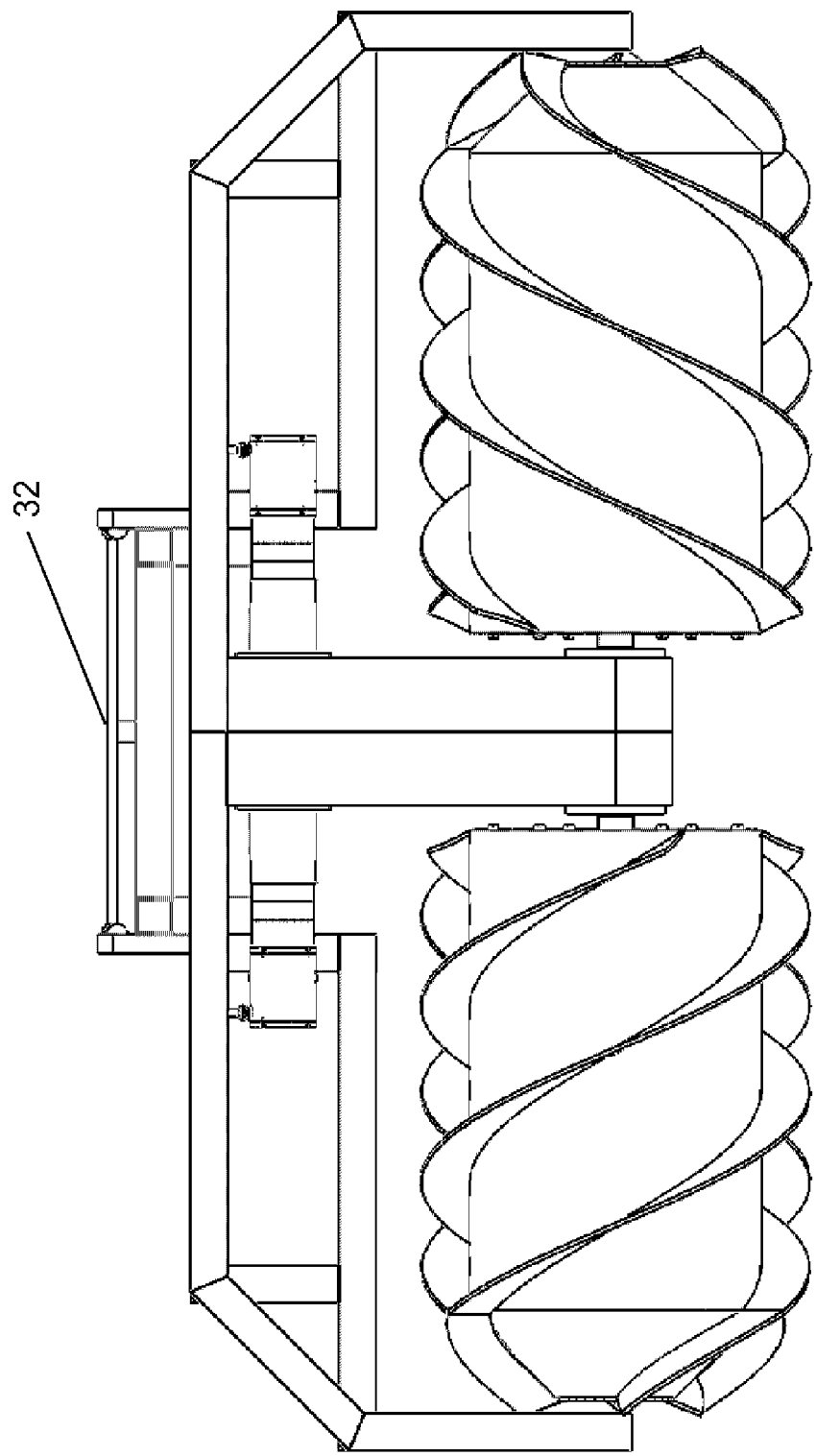
FIG. 10A is a side elevation view of the all-terrain rover, according to an embodiment of the present disclosure with a bogey style suspension, in a neutral position.
Figure 10B:
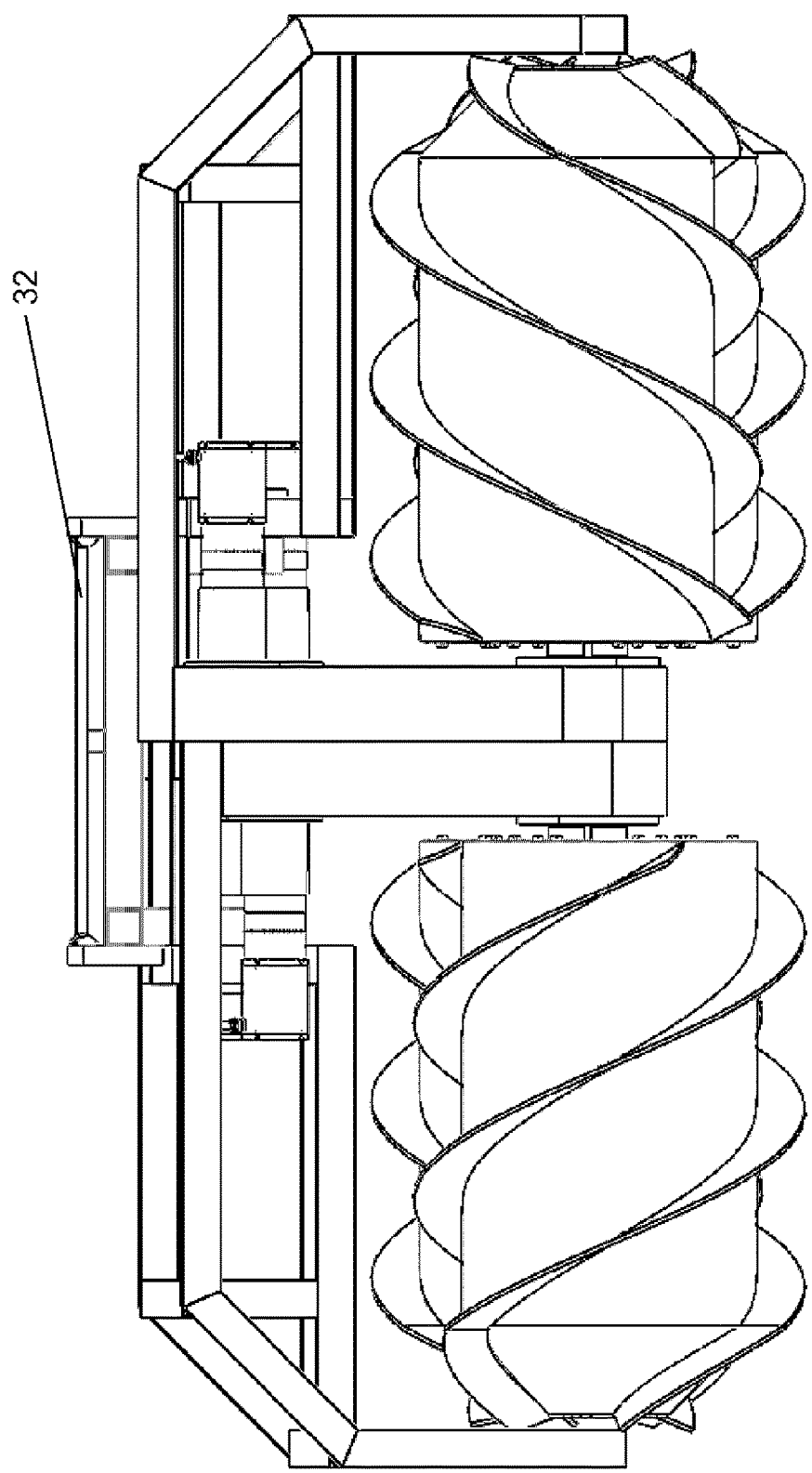
FIG. 10B is a side elevation view of the all-terrain rover, according to an embodiment of the present disclosure with a bogey style suspension, showing suspension movement.
Figure 11:
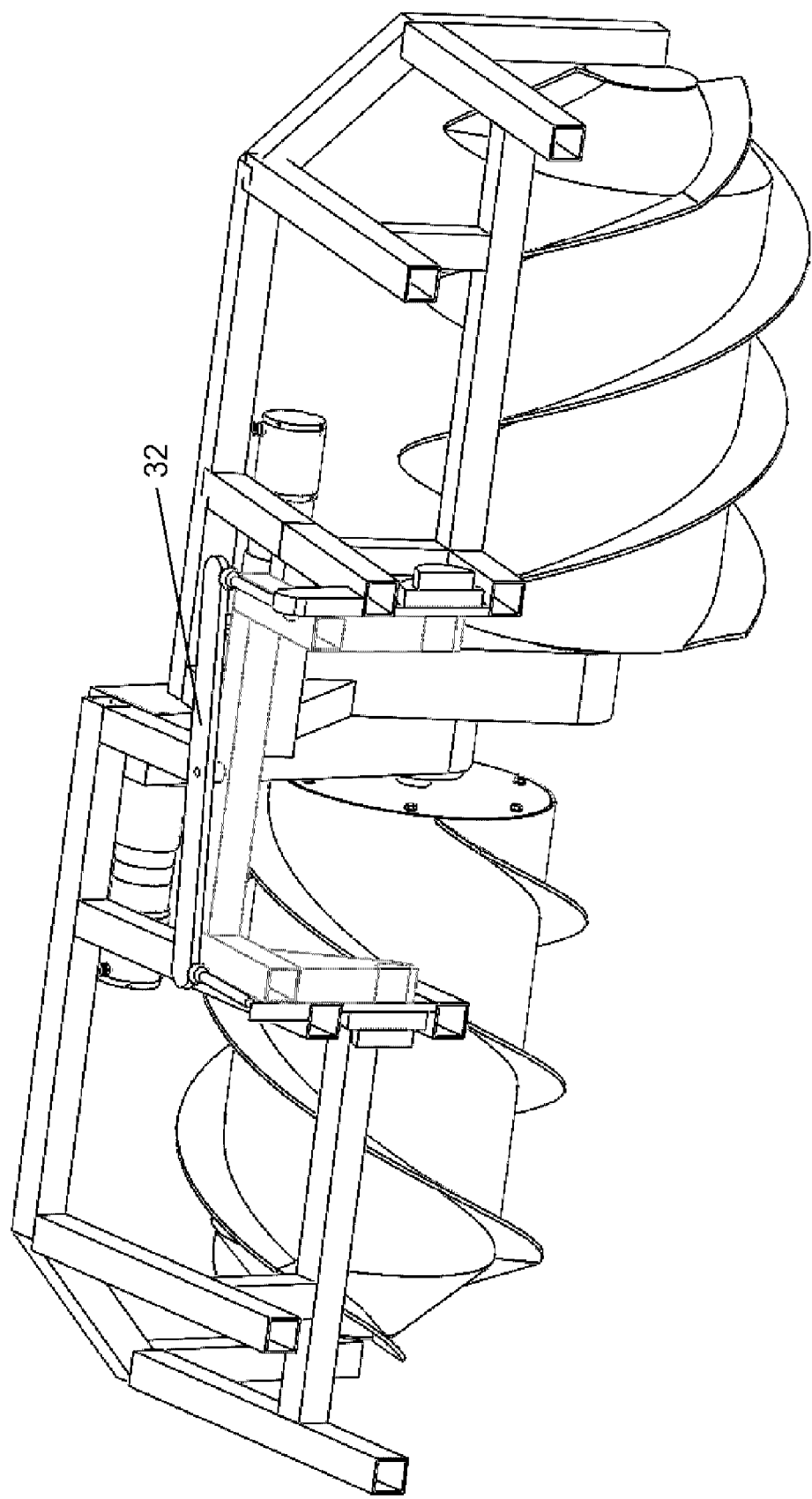
FIG. 11 is a partial cutaway view on a pair of cylinders of one embodiment of the all-terrain vehicle of the present disclosure, showing movement of the bogey style suspension.
Figure 12A:
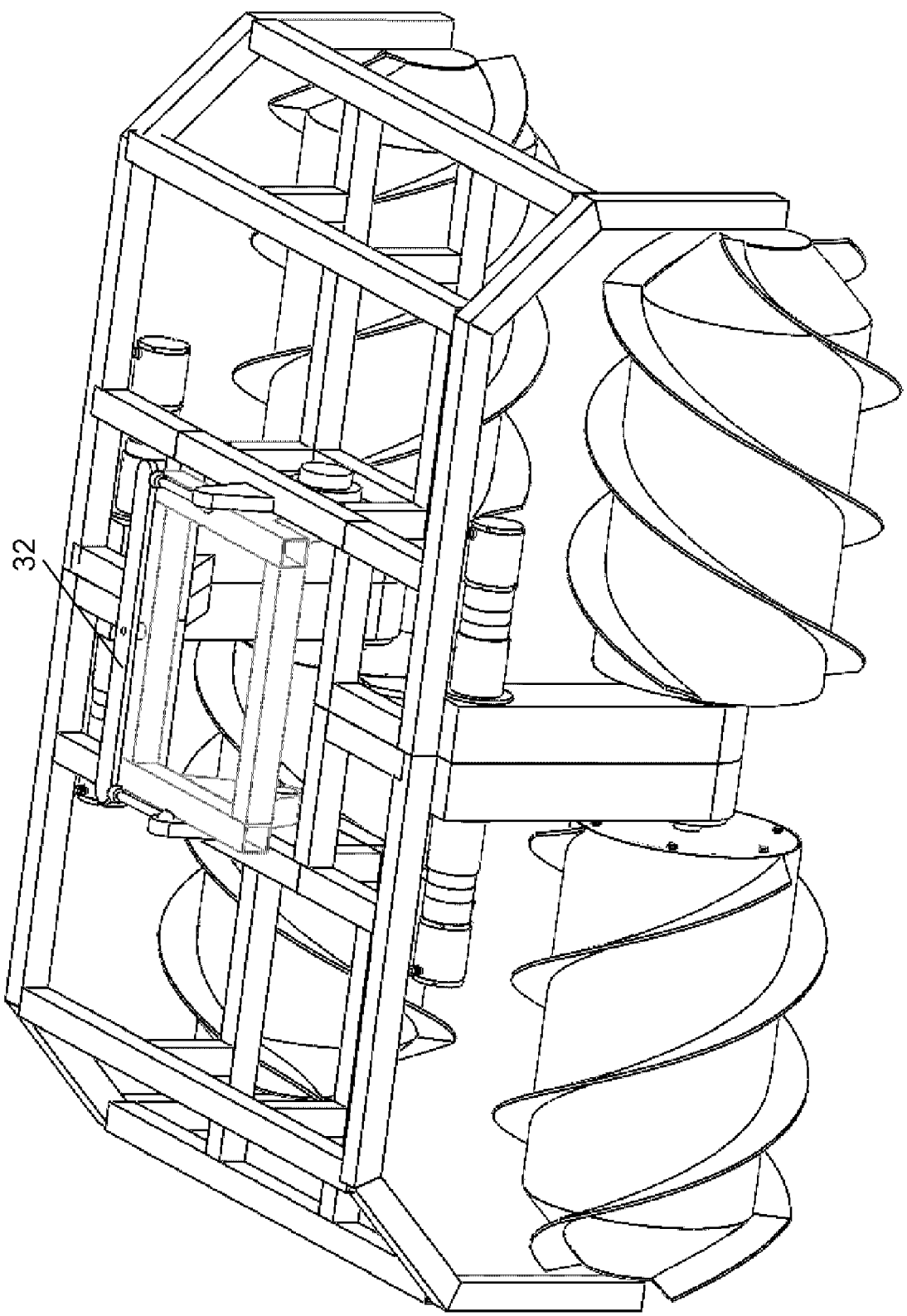
FIG. 12A is a side perspective view of the all-terrain rover, according to an embodiment of the present disclosure with a bogey style suspension, in a neutral position.
Figure 12B:
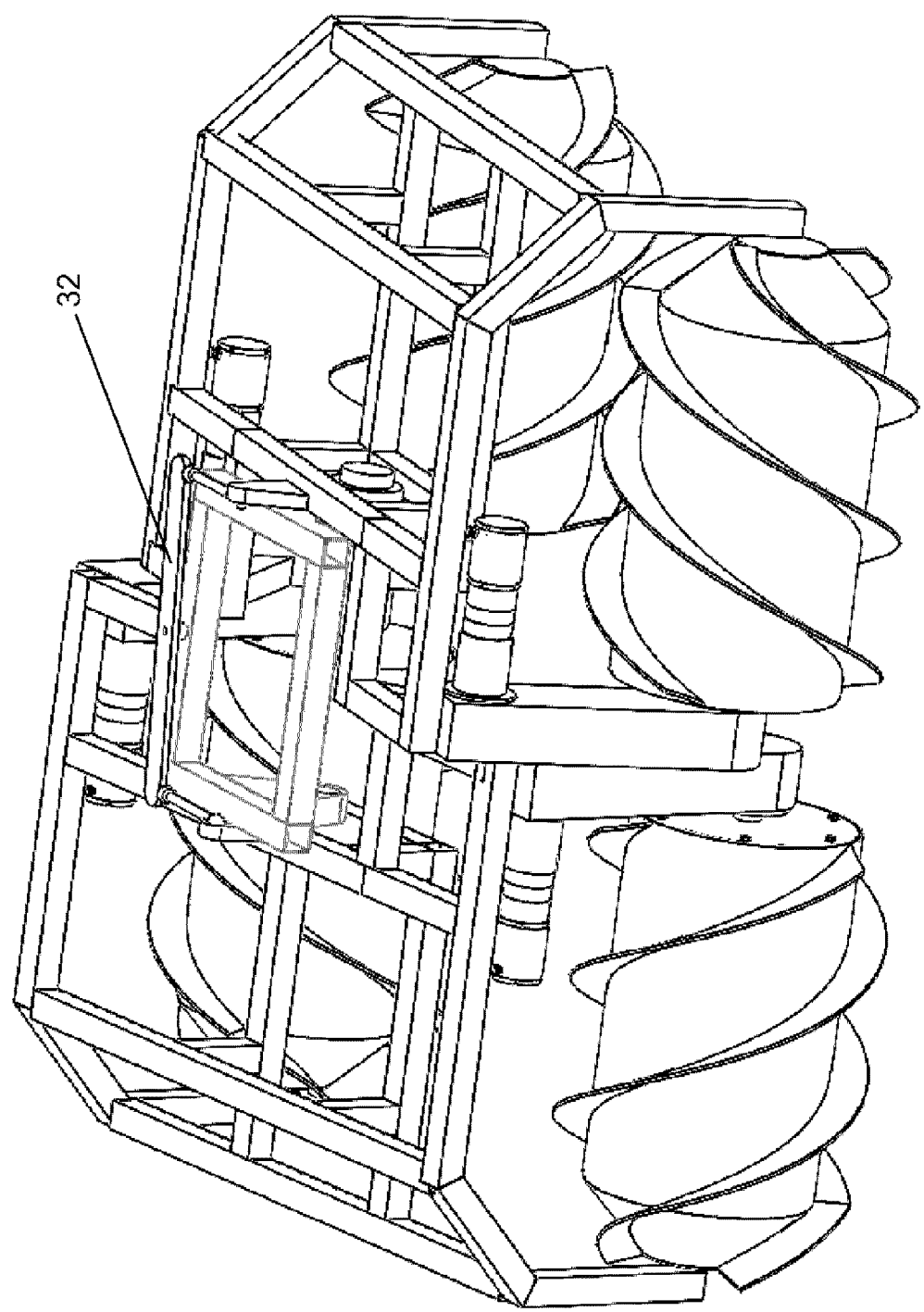
FIG. 12B is a side perspective view of the all-terrain rover, according to an embodiment of the present disclosure with a bogey style suspension, showing suspension movement.

The drive units 30 can be internal drive units, built into a body of each cylinder 20$a$/$b$ 22$a$/$b$, or can be external. The motors 35 can be located outside of the cylinders or the motors can be internal and contained with the drive unit 30 in the body of the cylinders 20$a$/$b$ 22$a$/$b$, as illustrated in FIG. 5$b$. In the case of internal drive units 30, the drive units 30 and optionally also the motors 35 can be contained within compartments 38 located at an end of each cylinder. In one configuration, optionally, a single compartment 38 can house the drive units 30 of two adjacent cylinders in a cylinder system.

Since each cylinder 20$a$/$b$ 22$a$/$b$ may be independently driven by a dedicated motor 35, this configuration allows steering during screw propulsion and also by rolling. Motors 35 may be powered electrically, hydraulically, or by internal combustion, or some combination. Each motor 35 may be mounted inside each cylinder 20$a$/20$b$/22$a$/22$b$, and may include a remotely controlled transmission to change the transmission output speed to match the motor power delivery capability. As mentioned earlier, each motor 35 can also be mounted outside of each cylinder 20$a$/20$b$/22$a$/22$b$, with a transmission to deliver mechanical power from the motor 35 to the respective cylinder 20$a$/$b$ 22$a$/$b$. Transmission methods may be chain drives, belt drives, or shafts to gear sets (spur, helical or worm gear sets) or combinations. Alternatively, a transmission may connect a single motor to a set of cylinders to reduce the number of drive motors for screw motion and for rolling motion. In such cases, a steering mechanism may be employed to turn individual cylinders 20$a$/20$b$/22$a$/22$b$. Another embodiment would employ a transmission to distribute power from a motor to multiple motors, and brakes on individual cylinders would allow speed reductions to produce turns. The cylinder systems 20/22 can be fixed to the frame 5, or a suspension mechanism 29 can be installed between the cylinder systems 20/22 and the frame 5 to allow for travel over very uneven terrain.

The transmission may include elements for changing its gear ratio while the rover 2 is deployed to improve its capability to handle various terrain types. In one embodiment, there is a chain and sprocket drive between the motors 35 and each cylinder shafts. In another embodiment, the motor output is connected to the cylinder through a gearbox.

The rover 2 may also include multi-speed transmissions to deliver performance in different regimes such as soil vs. water, allowing different terrain to be handled by changing transmission speed, without the need for large or oversized motors 35 that would otherwise be required to power through a range of terrain. In a further optional embodiment a direct-drive system with no transmission between the motor 35 and the cylinders 20a/b 22a/b may also be useable for travel in a smaller range of terrain and aquatic conditions.

The drive units 30 are connected to a power system, which powers the drive units 30. In one embodiment, the power system uses a battery system, electrically powering the drive units 30. The electrical power system may also employ a motor-driven generator, fuel cell or other means to produce electricity. Power sources can preferably also be selected for low emissions and/or be intrinsically electrically safe. In another embodiment, the power system provides hydraulic pressure or controlled hydraulic fluid flow, which powers the drive units 30.

Each cylinder 20a, 20b, 22a and 22b has a helical spiral flange 27. At each end of each multi-cylinder system 20/22 is a frustaconical or generally conical end cap 33 that enables the rover 2 to push past or avoid objects it moves into and to help maintain floatation and streamline the drive mechanism. The conical end caps 33 can be affixed to the end-most cylinders of each multi-cylinder system 20/22. In an embodiment, the cylinder systems 20, 22 themselves may be tapered at each end to include the function of cones without the need for separate conical end caps 33. In an embodiment the conical ends of cylinders may also have end flanges 36 to assist in locomotion and breaking ground or ice in the path of the rover 2. In some embodiments, the end flanges 36 on the conical ends can have the same pitch or be somewhat shallower than cylinder flanges 27 on the cylinders 20,22. In a further embodiment, multiple end flanges 36 may be present on each conical end.

With regards to flange geometry, a gentler flange angle relative to the axis of the cylinder 20a/b, 22a/b increases the resistance to the motor 35 and propels the rover 2 further with a single revolution. This high pitch angle is preferable on low-resistance surfaces such as fluids and semi-fluids such as mud. A shallow pitch angle provides less forward movement and less resistance per revolution of the rollers, and is preferable for firm surfaces. Useful flange helix angles are typically between approximately 20 and 65 degrees.

In a further embodiment described in further detail below, specially serrated cylinder or end flanges 27, 36 may be added to the cylinders 20a/b 22a/b or to the conical end caps 33 or both, to aid in traction on ice.

In an embodiment, a hull bow may be added at each end of the cylinders 20, 22 to aid in progress through water and very soft ground. The bow may have a motorized belt segment to provide lift and propulsion force in transition onto higher ground during screw propulsion.

With serrated flanges 27, 36 on one end and a hull bow on the other end of each cylinder system 20/22, this embodiment allows the rover 2 to climb out of water onto ice. The cylinders 20a/b 22a/b provide a preferable buoyancy efficiency (for example 92.5 kg/m) over buoyant track or wheel solutions. An additional measure for transition from water onto a surface with an edge is to deploy a flotation device at the stern to aid in lifting the stern.

The cylinder flange 27 preferably has sufficient width and rigidity to engage and cut into the surface, to produce a positive grip in the surface (ideally a soft surface) or to produce hydrodynamic force against a liquid body due to shear. In an embodiment, the cylinder flange 27 angle relative to the axis of the cylinder—also called pitch or thread attack angle—is 30 degrees, with a thread height-to-cylinder diameter ratio of 0.375. However, as described below, the thread attack angle and height may be varied for better performance on certain surfaces.

Preferably, the arrangement of cylinder flanges 27 serves to reduce counter-steering of the cylinders 20a/b, 22a/b by surface contact with the terrain and ensures movement and turning in the desired direction. The flange material can be selected from a number of options, including but not limited to metal, thermoplastics, thermosetting plastics & composites, or combinations. The flanges 27/36 may be manufactured by weldments, molding, or additive manufacturing, with coatings for friction reduction and abrasion resistance on different parts of the cylinder. The cylinders 20/22 can be manufactured integrally with flanges 27 or flanges 27 can be separately welded onto an existing cylinder. This also applied to conical end cap flanges 36.

Flange geometry modifications are also possible such as toothed or other aggressive edges on the flanges 36 present on the end cones 33 or on the cylinder flanges for grabbing onto hard material such as ice. Aggressive edges can also include those coated with grit materials. These edges could be removable to allow installing geometry for the terrain encountered, or to replace worn edges. Inflatable flanges 27/36 are also possible as part of structural support. Flanges 27/36 may also be modified to be porous to allow the flow of air through the flange to reduce adhesion and friction.

One firm ground, all cylinders 20a/20b/22a/22b may rotate in the same direction such that the rover 2 locomotion is by rolling.

In one embodiment of a matched pair of multi-cylinder systems 20/22, the spiral flanges 27 are oriented opposite to one another (one clockwise, the other counter clockwise), for example the spiral flanges of multi-cylinder system 20a/b may be clockwise while the spiral flanges on multi-cylinder system 22a/b may be counter clockwise. Thus, when the cylinder systems 20/22 are in counter-rotation, a forward or reverse motion results from contact between the flange and the ground.

In another embodiment, individual cylinders 20a/b or 22a/b within a given multi-cylinder system may have spiral orientations that oppose one another. For example, the spiral flanges of cylinders 20a may be oriented clockwise while the spiral flanges of cylinders 20b may be oriented counter-clockwise. In this case, the orientation of cylinder 22a may be oriented counter-clockwise while the spiral flanges of cylinders 22b may be oriented clockwise. In this arrangement each cylinder 20a/b 22a/b can be rotated in a particular direction to allow for forward and backwards motion along the axis of the cylinder 20a/b 22a/b as well as steerable motion. For example by altering the speeds of different cylinders 20a/b 22a/b, turning is achieved, much like a skid-steer operation.

Applying different speeds to different pairs of cylinders that are across from one another on the frame 5, for example one speed applied to each of 20a and 22a and a different speed applied to 20b and 22b, can also provide improved hydrodynamic efficiency in travelling over water bodies, wherein a first pair of cylinders 20a/22a at a first speed can serve to agitate the water and a second set pair of cylinders 20b/22b travelling at a second speed can serve to travel through the agitated water with low drag, or to move at a rotational speed that delivers the same thrust as the forward set of cylinders.

One arrangement of cylinders is for cylinder 22a to be right-hand turning, for cylinder 22b to be left-hand turning, for cylinder 20a to be left-hand turning, and for cylinder 20b to be right-hand turning.

In order to turn the rover 2, one set of multi-cylinder systems 20, 22 may rotate and the other rest immobile, resulting in a skid turn on some ground types. The pair of multi-cylinder systems 20, 22 may be rotated in the same direction to provide a sideways motion of the rover 2 to overcome an obstacle at the front or back, for example. In a submersible embodiment, the cylinders 20a/b, 22a/b with their flanges 27 provide forward and backward motion through water. For example, the cylinders may be rotated in the same direction, and the rover 2 may climb sideways over smaller obstacles. Rotating cylinders in the same direction can also be used to traverse hard ground and other ground types where the forward motion is difficult or inefficient, but steering is not possible unless the cylinder 20, 22 angles are actuated with respect to the frame 7, 8. In an embodiment, actuators (not shown) are present at one or both sides of the cylinders to angle the cylinder relative to the frame 7, 8.

The cylinders 20a/b 22a/b are hollow and sealed in one embodiment, to provide floatation when the rover 2 is on a fluid surface, so as to provide amphibious capability. In an embodiment, the cylinders 20a/b 22a/b may provide full buoyancy to the rover 2, and in another embodiment, the cylinders 20a/b 22a/b are only partially buoyant to allow the rover 2 to submerge. Buoyancy may be controllable to permit the rover 2 to submerge and resurface. Cylinders 20a/b 22a/b may include coatings to improve wear resistance and to reduce drag and adhesion, either temporarily applied or permanently bonded to the surface. Example coatings are TEFLON, antifouling marine paint, multicomponent coatings, or vegetable oil. Alternatively, an active system with air or liquid jets may be used to keep the cylinder surfaces clear, wherein the jets project fluid or air onto the surfaces to remove debris. A set of brushes or movable scraper may be mounted to the frame and in contact with the cylinder 20a/b 22a/b surfaces to scrape or brush off mud or soil adhering to the cylinders as the cylinders 20a/b 22a/b rotate.

The flanges 27 on cylinders may be articulated to provide suspension to the cylinders. Additionally the connections 37 between cylinders 20a/b, 22a/b in the multi-cylinder systems 20/22 may be by springs and shock absorbers to provide suspension to the cylinders, to allow the cylinders 20a/b, 22a/b to move relative to each other so as to remain in contact with the terrain on very rough terrain. This also allows the distance between cylinders to be lengthened or shortened. Shorter cylinder distance will increase the ground clearance of the rover 2 overall.

Connection points of the cylinders 20a/b, 22a/b to the rover 2 frame may also include springs or suspension elements 29 such as a vertical fork, a wishbone, a swing-arm, bogey, or other suspension configuration. The suspension elements 29 assist the cylinders 20a/b, 22a/b to pitch up and down over obstacles as well as some vertical motion, such that the maximum surface area of each cylinder 20a/b, 22a/b is in contact with the ground at all times.

FIGS. 9A to 12B illustrate aspects of the bogey suspension embodiment of the present rover 2. The bogey suspension system 32 allows for rover 2 to travel over larger changes in topography such as over rocky terrain, by accommodating movement of one pair of cylinders relative to another pair of cylinders. In the case illustrated in FIGS. 9B, 10B, 11 and 12B, it can be seen that front cylinders 20a/22a on a front part of frame 5/8 can be rotated about connection 34 and tilted relative rear cylinders 20b/22b. The bogey suspension system 32 allows not only for a particular cylinder to clear and travel over an obstacle, but also provides the ability for that cylinder to provide sufficient traction to bring along the remaining cylinders in the direction of travel.

The frame 5/8 may also optionally be articulated to provide further adaptability of the rover 2 over uneven terrain, and to maintain the cylinders in contact with the surface at all times. The frame 5/8 can be either hinged vertically to pivot by allowing relative pitching motion between front and rear pairs of cylinders, or hinged at the midpoint to allow a front pair of cylinders to roll relative to a rear pair of cylinders, or hinged such that one pair of cylinders can be turned in a yaw axis relative to the ground, or combinations.

The frame hinge can be passive, or it may entail springs and dampers, or it may be actively controlled using actuators. For locomotion in water, it is advantageous that the rear cylinders are approximately in line with the front cylinders. A locking mechanism may be used to keep the cylinders in line while in water, then unlocked for suspension across firm ground.

An additional advantage to hinging at the mid-point of the frame is the possibility to add a controllable locking mechanism. During normal activities, the two halves of the rover 2 are connected; but in the case where there is a problem with one of the cylinders, the rover 2 could disconnect into two separate halves, each with its own batteries and controller and radio system so that either half could act independently. In this way, a short tether or other device could be used to allow one half of the rover 2 to act to tow the other half of the rover 2 in the event of part of the rover becoming immobilized.

The control system 15 comprises a microcontroller or processor or computer, along with a wireless transmitter/receiver and antenna 12. The control system 15 is electrically connected and provides signals to control movement of the rover 2 and the sampling equipment 25. Further, an externally referenced positioning unit such as GNSS receives positional feedback and is connected to the microcontroller 15 to provide positional data. Rover 2 position and surroundings may be observed using satellite positioning, inertial measurement, cameras, lidar, radar, sonar, or combinations. Lights can be connected for illumination for operation in poor lighting conditions and at night or when the rover 2 moves inside sewers or other process piping or vessels. Structured lighting may be used to illuminate variable terrain geometry and types. Relative positioning methods such as an inertial measurement unit improve navigational accuracy and to allow position estimation in GNSS-denied environments such as ducts.

In one embodiment, a warning light and remote emergency stop buttons provide additional user feedback and control. The antenna 12 may be used to transmit and receive data with a base station, control center, or remote controller. The control system 15 may be controlled in a robot-controlled configuration or a remote-controlled configuration from the base station, controlled by a human operator. No specific changes in rover 2 hardware are required to change between these configurations, provided that the rover carries navigational instrumentation that is sensed by the onboard controller. Information communicated to a human operator or archived on a data server can be displayed as text or graphically on the ground station. The base station has a computer display for showing telemetry information in real time, including equipment condition and status of tasks that are in progress, as well as the rover 2 location on a map.

In a further embodiment control system 15 also receives sensor data from the cylinders 20a/b 22a/b and motor 35, such data including vibration, motor temperature, humidity, motor current and speed of the cylinders 20a/b, 22a/b. This data can then be transmitted by the control system 15 to a base station, control center, or remote controller to indicate whether the cylinders, drive units, and motors are operating correctly, or if wear or damage has occurred, or if repair or replacement is required.

Since the present cylinders 20a/b, 22a/b can be arranged as modular cylinder units, each having its own dedicated internal drive unit, motor and transmission and with only a single electrical connector need for power lines and for signal lines, a modular cylinder unit can be easily replaced with another modular cylinder unit, even in field conditions. This modular design of the rover cylinder units allows quick in-field removal of a modular cylinder unit from the frame 5 and replacement with another modular cylinder unit, with a very simple, single electrical connection required to the control system 15.

By using digital communications, a minimum number of signal conductors can be used to communicate with sensors inside the cylinder for control and condition monitoring.

Sensors are distributed at different locations to monitor changes in machine condition such as elevated temperature, excess vibration, and presence of moisture due to a leak. Sensor outputs are all connected to the microcontroller and can be communicated to the base station to modify or abandon the remaining mission tasks if the rover health is compromised, thereby improving the reliability of the mission.

An optional emergency stop button 21 can be included to stop the rover 2.

A system of drive sensors comprises sensors to detect the speed and direction of the cylinder rotation, GNSS to detect position and motion, climatic sensors to detect temperature humidity and wind speed. Additional sensors, including accelerometers and gyroscopes, indicate the orientation of the rover 2 to the microcontroller. External cameras including depth sensing cameras may be used to determine terrain in the rover 2's vicinity to prevent the rover 2 from passing over an embankment, for example. LIDAR, radar, and ultrasonic sensors may also be used for local environment determination.

In the case of using the rover 2 in sewers or other piping and process vessels which are either underground or otherwise confined, such cameras and other location sensors aid in navigation through sewer networks, providing collision avoidance as well as aiding in retrieval of the rover 2. In extraterrestrial use for moon and planetary exploration rocky surfaces and dusty environments can become an issue. The one or more sealed hatches 14, as well first and second enclosures 17, 19 serve to prevent ingress of such dust and also to prevent fouling of the equipment/payload and sensor systems held therein.

The battery systems monitor the voltage and battery life remaining as well as the output of the battery towards the propulsion systems. Sensors internal to the cylinders 20a/b, 22a/b may monitor moisture and temperature to detect and prevent system faults. Payload sensors detect the position and speed of the payload so that the deployment speed and depth can be accurately controlled. Payloads may include small robots for specific tasks, on-board analysis, and delivery of samples in the middle of a mission.

The control system 15 engages in speed control where the ground speed or cylinder speed is maintained at a desired rate by the onboard controller to achieve a desired locomotion. Speed may be determined by odometry, relative position estimation, or absolute positioning such as GNSS, or a combination. Alternatively, the controller can also engage in torque control where the torque on each cylinder is maintained at a desired level to achieve a desired locomotion. Feedback torque control can be implemented by estimating motor torque through a dynamic function of how the motor 35 converts electrical current to torque. In that way, current is measured to provide feedback. In another implementation, torque is measured in the motor output shaft by strain gauges that connect to an electronic conditioning unit that are all mounted on the motor output shaft, and the torque measurement is communicated to the control system 15 wirelessly. In another implementation, motor reaction torque into the frame is measured by strain gauges, a load cell, or other method. The torque control scheme controls a pair of co-axial cylinders 20a/b or 22a/b in a cylinder system 20, 22 in a coordinated manner so that a rear cylinder 20b or 22b follows its respective front cylinder 20a or 22a. When there is slip of one cylinder with respect to another cylinder in a co-axial cylinder pair, then it is indicative of either a change in the terrain medium or the maximum allowable torque into the terrain has been exceeded and the cylinders are beginning to spin.

A range of possible control schemes can be employed for controlling locomotion in different amphibious operational environments, as well as for transition zones where the rover 2 moves from one environment to another, for example from beach to water, or from water onto the surface of ice.

When there is a transition from one terrain to another, then a lag in transition control can be employed so that each cylinder is delivering a similar amount of power. When the rover 2 transitions from water to soil, the front cylinders 20a, 22a move more slowly to deliver a traction force at the vehicle speed. The rear cylinders 20b and 22b move more quickly than the front cylinders because there is less torque that is transformed to linear motion in water than on soil. Similarly, when the transition motion is in rolling, the front pair of cylinders move at a speed to deliver similar linear power to the rear cylinders that are rolling on the different medium. In some cases the transition will be difficult to observe with non-contact instruments such as lidar and cameras, and so the cylinders themselves become the sensors to determine soil properties for gain scheduling or other adaptive control schemes to prevent getting stuck. The intent of torque control is to deliver equivalent lateral force at the outer radius of each cylinder to both media.

The desired trajectory is typically determined using displacement variables, that is, the trajectory is a path defined by a set of position points at different points in times. Velocity trajectories can also be defined, as well as acceleration specifications such as maximum allowable acceleration thresholds. Displacements may be determined using an absolute coordinate frame and measured using a global navigation satellite system (GNSS). Alternatively, the trajectory may be described using a relative coordinate system and the measurements of position based on relative distance from the rover 2.

Automated routines are available so that the rover 2 can perform tasks without direct user inputs are facilitated through software in the controller. Control routines are uploaded to take into account feedback from the sensors on the rover 2 to facilitate robotic or autonomous control mode, and so the rover 2 can avoid getting stuck, and if it does get stuck, some strategies to free itself are included in the controller. A control routine may involve transition from hard to soft ground to water. A control routine may involve climbing out of water onto ice or from water onto solid terrain.

In a robot configuration, the rover 2 is instructed with a positional and sampling goal. The control system 15 then initiates movement of the cylinders 20a/b, 22a/b to direct the rover 2 to the desired sampling location, and provides signals to actuate the sampling equipment 25 to procure a sample. In this mode no direct control or supervision of the rover 2 is required. The internal controller calculates the drive motor 35 movements required to get the rover 2 to the commanded position. This mode is advantageous when many measurements or samples are required from a certain area, significantly reducing the manpower and operator training required to conduct the work.

In a remote-controlled configuration, an operator provides control signals to the rover 2 to direct the rover 2 to a location, wherein the operator may have visual contact with the rover 2, and direct according to what he or she sees, or the rover 2 may provide GNSS location, orientation and cameras showing the vicinity, such that the operator may determine an appropriate course of action at a given moment based on the input from the rover 2. In this mode the control signals provided are more directly sent as commands for certain rotations of the drive motors.

The sampling equipment 25 comprises a sampler tip connected to a descent mechanism to lower the tip into a surface below the rover 2. For some types of sampler an actuator operates the sampler when it is at the sampling depth. The sampling equipment 25 may have a cone penetrometer or other instrument connected to a descent mechanism to lower the tip into material below the surface on which the rover 2 is located. As the rover 2 travels over soil, interactions between the rover and the soil can further serve to promote soil drying or other soil amelioration steps and processes.

An additional extension mechanism (not shown) may be attached to the frame 5 as a manipulator to deploy tools by gripping selected tools and extending them out from the rover 2 to access elements around the rover for measuring, imaging or sample taking. Such extension mechanism can also extend from the rover frame 5 and contact the ground and provide drawing or pulling forces to assist with locomotion, in which case the extension mechanism may include an end effector that provides a horizontal and vertical force.

The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

The invention claimed is:

1. An all-terrain rover, comprising:
    a. a frame;
    b. first and second cylinder systems, each cylinder system being arranged on opposing sides of the frame, each of the first and second cylinder systems comprising:
        i. a first cylinder and a second cylinder arranged co-axially with one another, each cylinder having a spiral auger flange arranged on an exterior surface thereof; and
    c. sampling or measurement equipment mounted onto the rover; and
    d. a control system comprising one or more sensors associated with each of said cylinders for reading cylinder operational and status data; and a microcontroller, processor or computer for receiving said cylinder operational and status data and for processing said cylinder data to determine any one or more of a change in terrain medium or spinning of the cylinders to indicate that the rover is stuck;
    the microcontroller is configured to apply a first speed to the first cylinders of the first and second cylinder systems; and further configured to apply a second speed to the second cylinders of the first and second cylinder systems;
    wherein an orientation of the spiral flanges of the first and second cylinder systems and different speeds applied by the microcontroller to each of the first and second cylinders of the first and second cylinder systems allow for forward and backwards motion, turning and sideways motion of the all-terrain rover.

2. The all-terrain rover of claim 1, wherein each cylinder comprises at least one frustoconical or generally conical end.

3. The all-terrain rover of claim 2, wherein the conical ends have a form selected from the group consisting of separate end caps affixable to an end-most cylinder of each cylinder system, and a tapering of each end of the end-most cylinder.

4. The all-terrain rover of claim 3, wherein the conical ends comprise one or more end flanges, said end flanges having a pitch that is the equal to or shallower than a pitch of the flanges on the cylinders.

5. The all-terrain rover of claim 4, wherein any one or more of the cylinder flanges and end flanges comprise serrations or are porous to allow flow through the flange.

6. The all-terrain rover of claim 1, wherein the spiral flanges of a first cylinder of the first cylinder system is oriented in an opposite orientation to the spiral flanges of a second cylinder of the first cylinder system and the orientation of a first cylinder of the second cylinder system is oriented in an opposite orientation to the spiral flanges of a second cylinder of the second cylinder system such that each cylinder can be rotated in an individual direction and individual speed to create forward and backwards motion along the axis of the cylinders as well as steerable motion.

7. The all-terrain rover of claim 6, wherein the drive unit is contained within each cylinder of each cylinder system.

8. The all-terrain rover of claim 7, wherein the drive unit is contained in a manner selected from the group consisting of in a compartment associated with each cylinder and in a single compartment shared by the coaxial cylinders of a cylinder system.

9. The all-terrain rover of claim 1, wherein the frame is articulable to provide suspension to the rover over uneven terrain.

10. The all-terrain rover of claim 9, wherein articulation of the frame is selected from the group consisting of passive articulation and actively controlled articulation using actuators.

11. The all-terrain rover of claim 9, wherein the frame is lockable against articulation for alignment of cylinders.

12. The all-terrain rover of claim 9, wherein the frame is separable at points of articulation to provide separation of the rover into two separate, independently operable halves.

13. The all-terrain rover of claim 1, wherein the control system measures and controls a torque of the rover by maintaining a torque on each cylinder at a predetermined level to achieve a predetermined locomotion.

14. The all-terrain rover of claim 13, wherein torque is measured by strain gauges connected to an electronic conditioning unit that are mounted on a motor output shaft, and wherein the torque measurement is wirelessly communicable to the control system.

15. The all-terrain rover of claim 1, wherein the control system receives sensor data from the cylinders and motors and wherein said the transmitter transmits the data to a base station to determine status and operation of the cylinders, drive units, and motors.

16. The all-terrain rover of claim 15, wherein the sensor data from cylinders and motors include vibration, excess vibration, motor temperature, elevated motor temperature, humidity, presence of moisture, motor current, speed of the cylinders, and combinations thereof.

17. The all-terrain rover of claim 16, wherein sensor outputs communicated to a base station can determine a modification of rover tasks or abandonment of rover tasks in a case of damage, or system fault.

18. The all-terrain rover of claim 1, wherein the control system includes GNSS, inertial measurement, climate sensors, cameras, lidar, radar, ultrasound, and/or sonar to provide positional data.

19. The all-terrain rover of claim 18, wherein the GNSS, inertial measurement, cylinder sensors and climate sensors measure external disturbance including wind to improve motion or response of the rover.

20. The all-terrain rover of claim 6, wherein the drive unit includes a transmission between an externally mounted motor and the cylinder.

21. The all-terrain rover of claim 20, wherein the transmission is configurable such that a single motor can drive more than one cylinder.

22. The all-terrain rover of claim 6, wherein the drive units comprise a direct-drive system absent of a transmission between the motor and the cylinders.

23. The all-terrain rover of claim 6, wherein each cylinder with drive unit, further comprises one or more dedicated sensors to form a modular cylinder unit, removably affixable to the frame.

24. The all-terrain rover of claim 1, wherein the spiral flanges of the first cylinder system are oriented opposite to an orientation of the spiral flanges of the second cylinder system such that, in counter-rotation, a forward or reverse motion results from contact between the flanges and a surface of travel.

25. The all-terrain rover of claim 1, wherein applying the first speed to the first cylinders of the first and second cylinder systems and applying the second speed to the second cylinders of the first and second cylinder systems provides improved hydrodynamic efficiency in travelling over water bodies.

26. The all-terrain rover of claim 1, wherein turning of the rover is accomplished by rotating one of the first or second cylinder systems while maintaining the other of the first or second cylinder systems at rest.

27. The all-terrain rover of claim 1, wherein sideways motion over smaller obstacles of the rover is accomplished by rotating both first and second cylinder systems in the same direction.

28. The all-terrain rover of claim 1, wherein the flanges are articulable to provide suspension to the cylinders.

29. The all-terrain rover of claim 1, wherein connections between first and second cylinders of each of the first and second cylinder systems are flexible to provide suspension to the cylinders, to allow the cylinders to move relative to each other.

30. The all-terrain rover of claim 1, wherein connection of the cylinders to the rover frame includes a suspension element to allow the cylinders to pitch up and down over obstacles and to maximize surface contact of each cylinder with the ground.

31. The all-terrain rover of claim 1, wherein the control system is controllable between robot configuration and remote-controlled configuration from a base station, without hardware changes between configurations.

32. The all-terrain rover of claim 1, wherein the control system measures and controls a position of the rover by maintaining a speed of each cylinder at a predetermined level to achieve a predetermined locomotion trajectory.

33. The all-terrain rover of claim 1, wherein each cylinder system further comprises a drive unit associated with each cylinder system, each drive unit including a motor and a power source and wherein arrangement of flanges of the one or more cylinders of the first and second cylinder systems allow for forward and backwards motion, as well as turning and sideways motion of the all-terrain rover.

34. The all-terrain rover of claim 1, wherein applying the first speed to the first cylinders of the first and second cylinder systems and applying the second speed to the second cylinders of the first and second cylinder systems provides for turning of the rover to enable skid-steer operation.

35. The all-terrain rover of claim 1, wherein the first speed applied to the first cylinders of the first and second cylinder systems is slower than the second speed applied to the second cylinders of the first and second cylinder systems while the rover transitions from one terrain to another during a linear motion.

36. The all-terrain rover of claim 1, wherein the first speed applied to the first cylinders of the first and second cylinder systems is substantially equivalent to the second speed applied to the second cylinders of the first and second cylinder systems while the rover transitions from one terrain to another during a rolling motion.

* * * * *